(12) United States Patent
Baxendale

(10) Patent No.: US 10,088,021 B2
(45) Date of Patent: Oct. 2, 2018

(54) CONTINUOUSLY VARIABLE TRANSMISSION

(71) Applicant: Ford Global Technologies, LLC, Dearborn, MI (US)

(72) Inventor: Timothy Hart Baxendale, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/216,804

(22) Filed: Jul. 22, 2016

(65) Prior Publication Data

US 2018/0023673 A1 Jan. 25, 2018

(51) Int. Cl.
*F16H 15/40* (2006.01)
*F16H 37/02* (2006.01)

(52) U.S. Cl.
CPC ........... *F16H 15/40* (2013.01); *F16H 37/021* (2013.01); *F16H 37/022* (2013.01)

(58) Field of Classification Search
CPC ....... F16H 15/40; F16H 37/022; F16H 37/021
See application file for complete search history.

(56) References Cited

U.S. PATENT DOCUMENTS

| 6,551,210 B2 * | 4/2003 | Miller | B62M 11/00 475/189 |
|---|---|---|---|
| 7,074,155 B2 | 7/2006 | Miller | |
| 8,784,260 B2 | 7/2014 | Shiina et al. | |
| 2013/0190131 A1 * | 7/2013 | Versteyhe | F16H 15/40 476/31 |
| 2016/0290451 A1 * | 10/2016 | Lohr | F16H 15/52 |

FOREIGN PATENT DOCUMENTS

CN 103470652 B 9/2015

* cited by examiner

*Primary Examiner* — David J Hlavka
(74) *Attorney, Agent, or Firm* — James Dottavio; Brooks Kushman P.C.

(57) ABSTRACT

A variator suitable for an automotive continuously variable transmission utilizes a roller frictionally engaging two rotating plates. The plates are connected to an input such that they rotate at the same speed but in opposite directions. To change the ratio, the roller is moved along an axis perpendicular to the axis of rotation of the two counter-rotating plates. Power from the roller is transmitted to a bevel gear which meshes with an output bevel gear. The output bevel gear rotated about the same axis as the plates.

15 Claims, 4 Drawing Sheets

FIG. 1 – Prior Art

CONTINUOUSLY VARIABLE TRANSMISSION

TECHNICAL FIELD

This disclosure relates to the field of automotive transmissions. More particularly, the disclosure pertains to a variator for a continuously variable transmission.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising. Typically, a transmission has a housing mounted to the vehicle structure, an input shaft driven by an engine crankshaft, and an output shaft driving the vehicle wheels, often via a differential assembly which permits the left and right wheel to rotate at slightly different speeds as the vehicle turns.

Various ways of known of varying the speed ratio of a transmission. Some transmissions have a collection of gearing and shift elements configured such that engaging various subsets of the shift elements establish various power flow paths between an input shaft and an output shaft. These various power flow paths operate at different speed ratios between the input shaft and the output shaft. To change from one speed ratio to another speed ratio, one or more shift elements are disengaged and one or more shift elements are engaged in order to change which power flow path is utilized. Other transmissions utilize a variator to change speed ratio. A variator is capable of efficiently transmitting power at any speed ratio between an upper and lower limit and changing the speed ratio gradually while transmitting power. The upper and lower speed ratio limits of the variator may not match the speed ratio requirements of the vehicle. In that case, a transmission with a variator may also include gearing and shift elements such that the range of available speed ratios between the input shaft and the output shaft match vehicle requirements. The mechanism used to adjust the speed ratio influences the sensations experienced by vehicle occupants, including engine noise and vehicle acceleration.

FIG. 1 illustrates a front wheel drive (FWD) powertrain layout utilizing a Continuously Variable Transmission (CVT). Engine 10 converts chemical energy stored in liquid fuel into mechanical power to exert torque on a crankshaft. CVT 12 adapts the mechanical power from the crankshaft to exert torque on front wheels 14 and 16. Rear wheels 18 and 20 are not powered unless additional hardware is provided. CVT 12 includes several components including a launch device 22, a forward/reverse mechanism 24, a variator 26, and a differential 28. Launch device 22 permits transmission of torque even when the vehicle is stationary. Launch device 22 may be, for example, a torque converter or a launch clutch. Forward/reverse mechanism 24 establishes either a forward mode in which the engine power propels the vehicle forward or a reverse mode in which the direction of rotation and torque is reversed to propel the vehicle backwards. Variator 26 is controlled to establish various speed and torque ratios.

Several types of variator are known in the art. These variator types differ from one another in several respects including: range of ratio variability, torque transfer capacity, whether the input and output rotate in the same direction or the opposite direction, and whether the input and the output rotate about the same axis. A belt variator includes two adjustable sheaves, a driving sheave and a driven sheave, supported for rotation about two parallel axes. Each sheave may include two conical halves separated by a variable distance. A continuous belt with a relatively constant length and width frictionally engages both sheaves. As the two conical halves of a sheave are pushed together, the belt moves radially outward relative to the sheave's axis. Conversely, as the two conical halves of a sheave move apart, the belt moves radially inward relative to the sheave's axis. The belt transfers power from the driving sheave to the driven sheave at a speed ratio and torque ratio dictated by the radius of the frictional engagement point on each sheave. To increase the speed of the output relative to the input, the conical halves of the driving sheave are pushed closer together and the conical halves of the driven sheave are pushed apart. The radius of the frictional contact on the driving sheave increases while the radius of the frictional contact on the driven sheave decreases.

SUMMARY

A variator includes first and second plates, a first roller, and first and second bevel gears. The first and second plates are each supported for rotation about a first axis and constrained to rotate in opposite directions at the same speed. For example, they may be interconnected by a double pinion planetary gear set, with the ring gear fixed, the carrier fixedly coupled to one plate, and the sun gear fixedly coupled to the other plate. The first roller is supported to rotate about a second axis perpendicular to the first axis and frictionally engages the first and second plates. To adjust the speed ratio, the first roller is moveable along the second axis. To accomplish this movement, the roller may be supported by bearings relative to a non-rotating follower. The follower may be threaded onto a rod that extends along the second axis such that rotation of the rod moves the follower axially. The first bevel gear is driveably connected to the first roller, and may be supported about the second axis. The second bevel gear is supported for rotation about the first axis and meshes with the first bevel gear. Second and third rollers may be supported about third and fourth axes parallel to the first axis and may frictionally engage the forst and second plates. The second and third rollers may be driveably connected to third and fourth bevel gears that mesh with the second bevel gear.

In another embodiment, a variator includes first and second plates, first and second bevel gears, and a roller. The first and second plates are constrained to counter-rotate about a first axis. For example, they may be interconnected by a double pinion planetary gear set. The first bevel gear is also supported for rotation about the first axis. The roller is supported for rotation about a second axis perpendicular to the first axis and frictionally engages the first and second plates. The roller is moveable along the second axis. The roller may be supported by bearings from a non-rotating follower. The follower may be threaded to a rod such that the follower moves along the second axis in response to rotation of the rod. The second bevel gear is driveably connected to the roller and meshes with the first bevel gear. The second bevel gear may rotate about the second axis.

A continuously variable transmission includes first and second plates, first and second bevel gears, and a roller. The first and second plates are constrained to counter-rotate about a first axis. The first bevel gear is also supported for rotation about the first axis. The roller is supported for rotation about a second axis perpendicular to the first axis and frictionally engages the first and second plates. The roller is moveable along the second axis. The second bevel gear is driveably connected to the roller and meshes with the first bevel gear. The second bevel gear may rotate about the second axis. The continuously variable transmission may further include a forward/reverse mechanism and a launch device connected in series with the variator.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
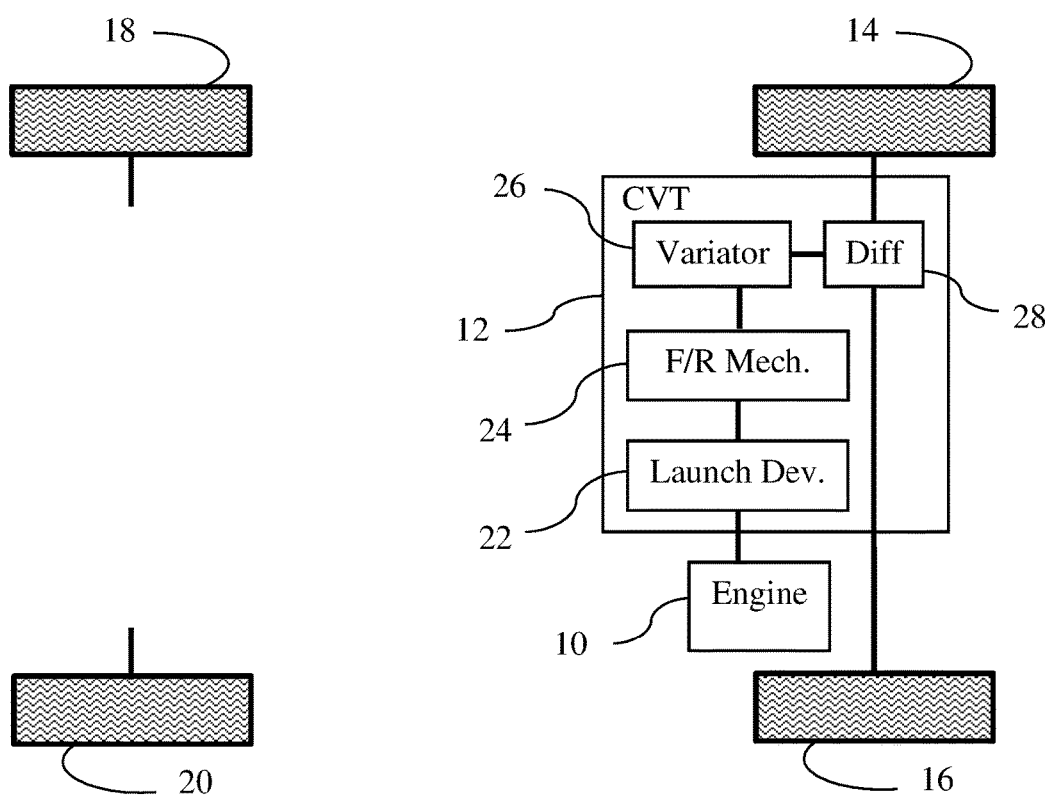
FIG. 1 is a schematic diagram of an exemplary vehicle powertrain.
Figure 2:
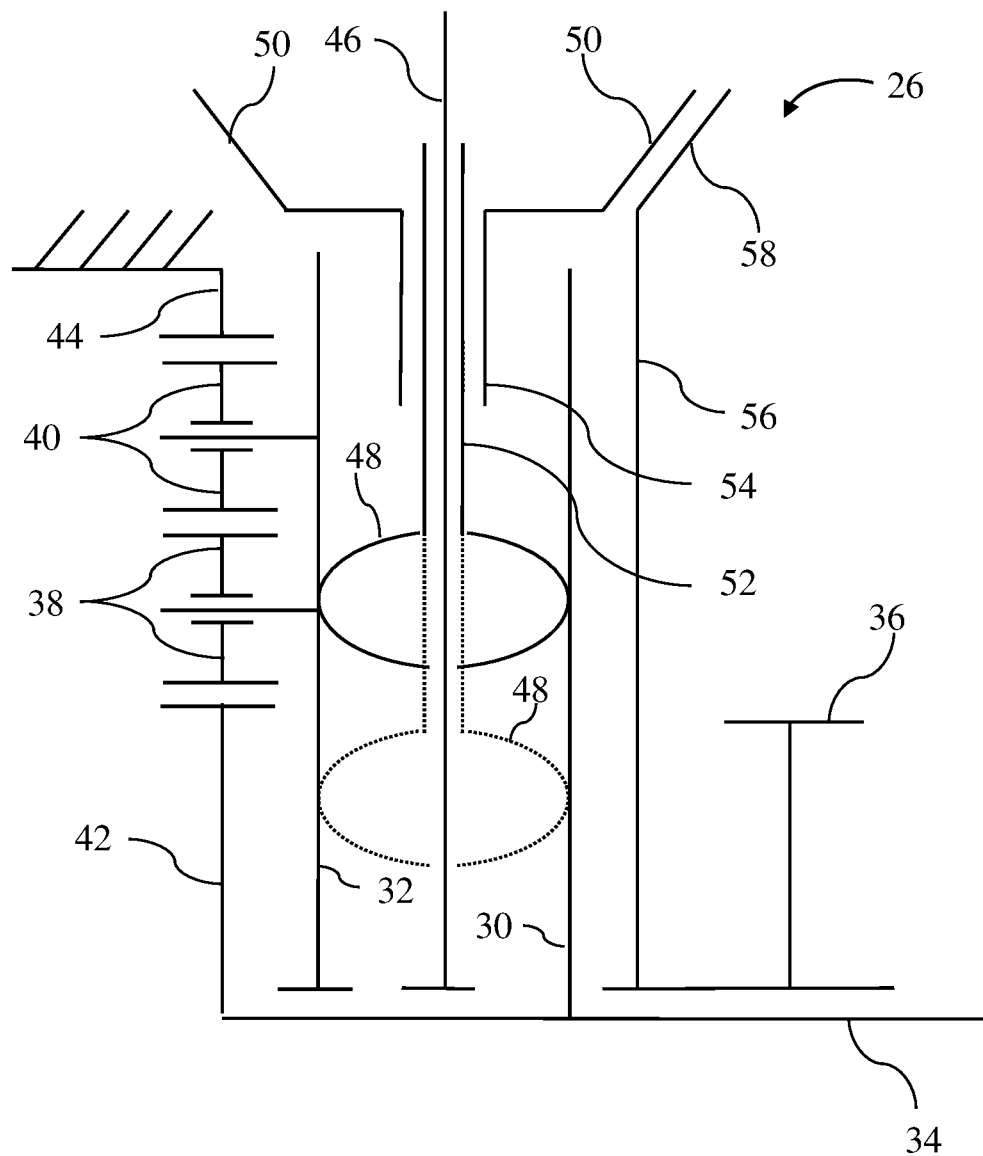
FIG. 2 is a schematic side view of a variator suitable for use in the powertrain of FIG. 1.
Figure 3:
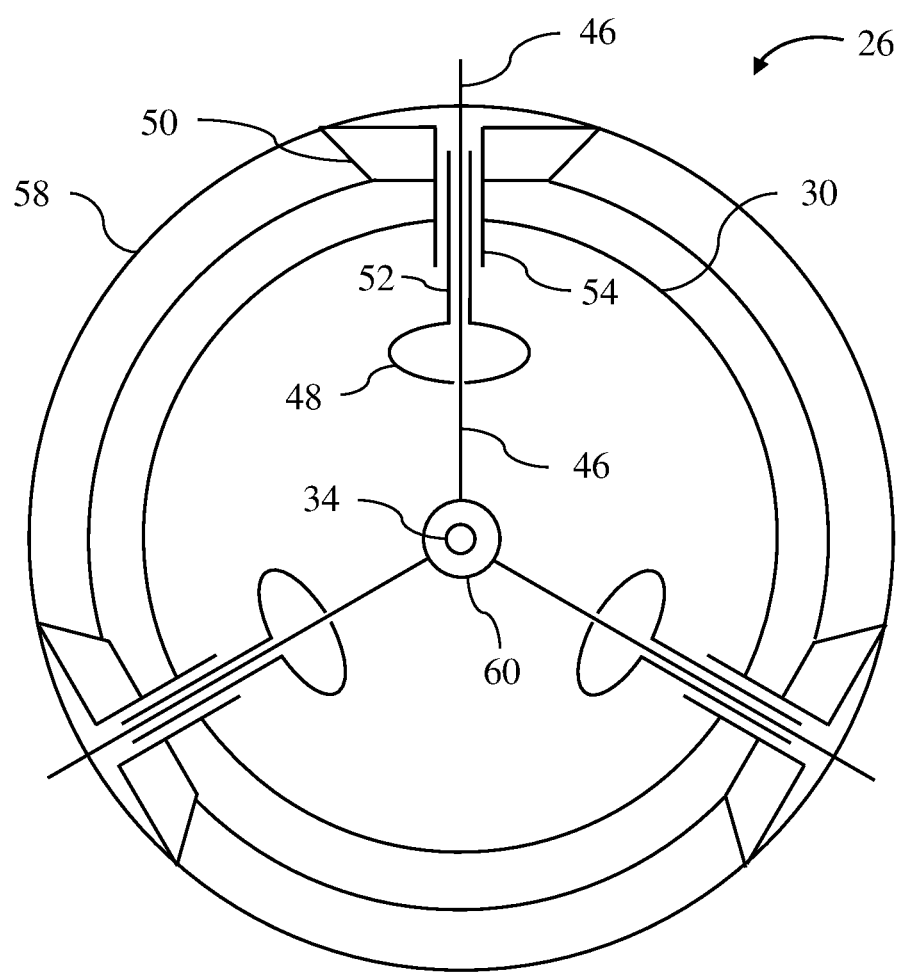
FIG. 3 is a cut-away end view of the variator of FIG. 2.

FIG. 2 shows a cross section of a variator suitable for use in an automotive continuously variable transmission. FIG. 3 shows a cut-away end view of the variator showing the space between the first and second plates 30 and 32. The variator transmits power from variator input shaft 34 to variator output gear 36. Variator input shaft 34 is driveably connected to the output of the forward/reverse mechanism 24. Variator output gear is driveably connected to the carrier of the differential 28. Alternatively, forward/reverse mechanism 24 and/or launch device 22 may be located downstream of the variator 26. Two components are driveably connected if there is a power flow path connecting the components and constraining their speeds to have a predetermined ratio.

First plate 30 is fixed to variator input shaft 34. Second plate 32 is constrained to rotate in the opposite direction but at the same speed as the first plate. In the embodiment illustrated in FIG. 2, this is accomplished by a double pinion planetary gear set. The carrier of the gear set is fixed to the second plate 32. Two sets of planet gears, 38 and 40, are supported for rotation with respect to the carrier. Each inner planet gear 38 meshes with sun gear 42 and with one of the outer planet gears 40. Each outer planet gear 40 meshes with one of the inner planet gears 38 and with ring gear 44. Sun gear 42 is fixed to variator input shaft 34. Ring gear 44 is held stationary. The number of gear teeth on ring gear 44 is exactly double the number of gear teeth on sun gear 42.

A plurality of roller shafts 46 extend radially outward between the first and second plates 30 and 32. A roller 48 is supported for rotation about each roller shaft. The rollers frictionally engage the first and second plates. The rollers are supported such that they can be moved radially along roller shaft 46, changing a speed ratio between shaft 34 and roller 48. When the roller is positioned near the center of rotation of the plates, it rotates slower relative to shaft 34 than when the roller is positioned farther out on the plates.

Each roller is driveably connected to a side bevel gear 50 which is supported for rotation but is axially fixed. In the embodiment illustrated in FIGS. 2 and 3, roller 48 is driveably connected to side bevel gear 50 by concentric shafts 52 and 54. The concentric shafts rotate in unison but can accommodate relative axial movement, for example via linear bearings. Inner concentric shaft 52 is fixed to roller 48 while outer concentric shaft 54 is fixed to side bevel gear 50. Alternatively, side bevel gear 50 could be supported for rotation about an axis parallel to roller shaft 46 and driveably connected to roller 48 via spur gears. For example, a long spur gear could be fixed to roller 48 while a narrow spur gear is fixed to side bevel gear 50.

Output disk 56 is supported for rotation about shaft 34 and include output bevel gear 58. Output bevel gear 58 meshes with each side bevel gear 50. Output disk 56 is fixed to variator output gear 36.

FIG. 3 shows three roller assemblies spaced evenly around the circumference of the variator. The number of roller assemblies can vary based on torque capacity requirements and available space. One end of each of the roller shafts 46 is supported by hub 60. Each roller transfers power at two contact points, one on the first plate and one on the second plate. Therefore, with three roller assemblies, the power is split between six contact points. Additional rollers increases torque capacity, but may limit the minimum speed ratio to preclude interference between adjacent rollers.

Figure 4:
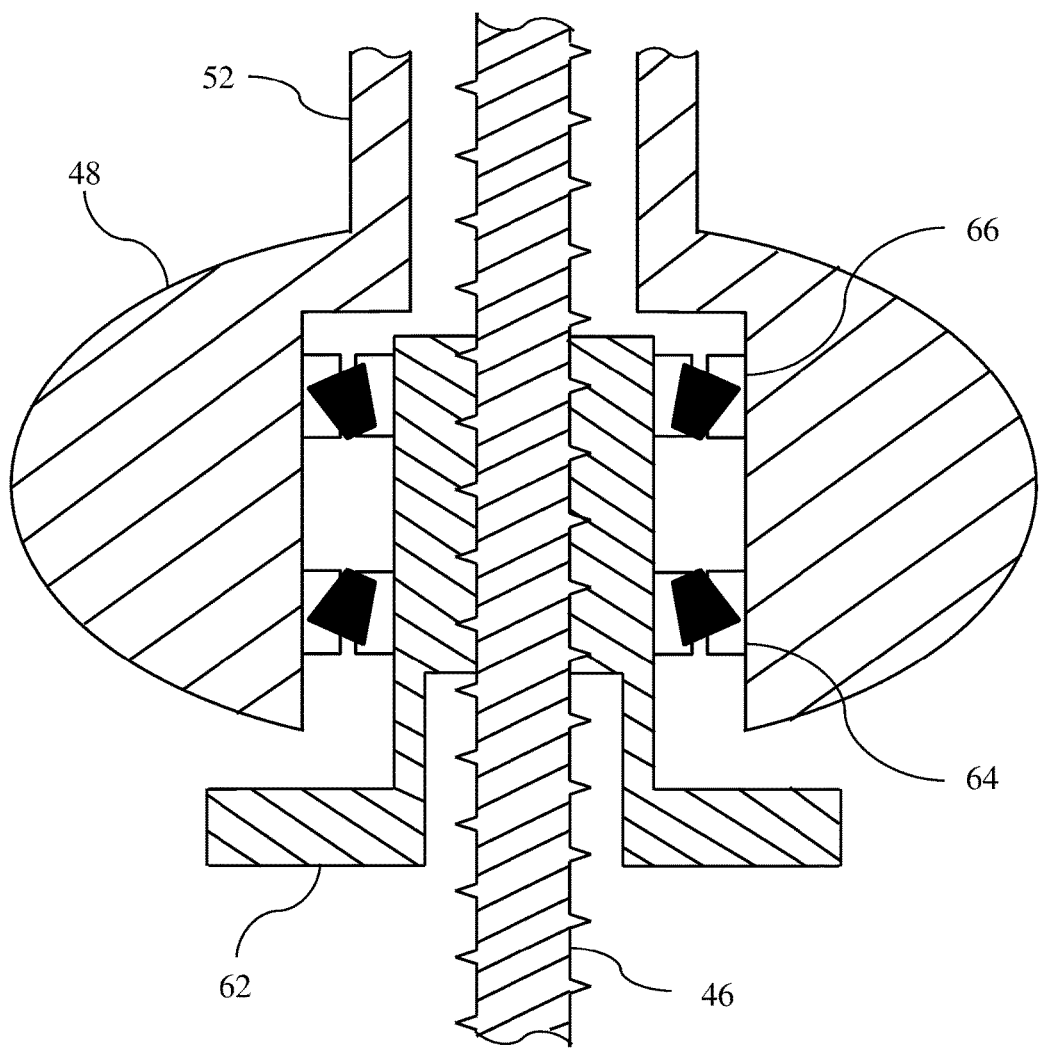
FIG. 4 is a cross sectional view of a roller support suitable for use in the variator of FIGS. 2 and 3.

FIG. 4 illustrates a mechanism for adjusting the radial position of the roller 48. In this embodiment, roller shaft 46 is a threaded rod. Follower 62 is threaded onto roller shaft 46. Follower 62 is prevented from rotating about roller shaft 46. For example, fixed rods (not shown) may extend through follower 62 or small rollers (not shown) may hold roll against plate 30 or 32 to prevent rotation. Roller 48 is supported for rotation relative to follower 62 by tapered roller bearings 64 and 66. To change the radial position of roller 48, roller shaft 46 is rotated such that the threads force follower 62 inward or outward. Gearing near hub 60 may link the several roller shafts together such that rotation of one causes rotation of the others, causing the several rollers to move radially in unison.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:
1. A variator comprising:
a first plate supported to rotate about a first axis;
a second plate constrained to rotate about the first axis at a same speed in an opposite direction as the first plate;

a first roller frictionally engaging the first and second plates and supported to rotate about a second axis perpendicular to the first axis, the first roller moveable along the second axis;
a first bevel gear driveably connected to the first roller; and
a second bevel gear supported to rotate about the first axis and in continuous meshing engagement with the first bevel gear.

2. The variator of claim 1 wherein the second plate is constrained to rotate at a same speed in an opposite direction as the first plate by a double pinion planetary gear set comprising:
a sun gear fixedly coupled to the first plate;
a ring gear fixedly held against rotation;
a carrier fixedly coupled to the second plate;
a plurality of first planet gears each supported for rotation with respect to the carrier and meshing with the sun gear; and
a plurality of second planet gears each supported for rotation with respect to the carrier and meshing with the ring gear and one of the first planet gears.

3. The variator of claim 1 wherein the first bevel gear rotates about the second axis.

4. The variator of claim 1 further comprising:
a second roller frictionally engaging the first and second plates and supported to rotate about a third axis perpendicular to the first axis, the second roller moveable along the third axis; and
a third bevel gear driveably connected to the second roller and in continuous meshing engagement with the second bevel gear.

5. The variator of claim 4 wherein the third bevel gear rotates about third axis.

6. The variator of claim 4 further comprising:
a third roller frictionally engaging the first and second plates and supported to rotate about a fourth axis perpendicular to the first axis, the third roller moveable along the fourth axis; and
a fourth bevel gear driveably connected to the third roller and in continuous meshing engagement with the second bevel gear.

7. The variator of claim 1 further comprising:
a threaded rod supported along the second axis;
a follower threaded onto the threaded rod and restrained from rotation about the second axis such that rotation of the threaded rod results in axial movement of the follower along the second axis; and
bearings supporting the first roller for rotation about the follower.

8. A variator comprising:
first and second plates constrained to counter-rotate about a first axis;
a first bevel gear supported for rotation about the first axis;
a roller frictionally engaging the first and second plates and supported to rotate about a second axis perpendicular to the first axis, the roller moveable along the second axis; and
a second bevel gear drivably connected to the roller and meshing with the first bevel gear.

9. The variator of claim 8 wherein the first and second plates are constrained to counter-rotate by a double pinion planetary gear set having a sun gear fixedly coupled to the first plate, a ring gear fixedly held against rotation, and a carrier fixedly coupled to the second plate.

10. The variator of claim 8 wherein the second bevel gear rotates about the second axis.

11. The variator of claim 8 further comprising:
a threaded rod supported along the second axis;
a follower threaded onto the threaded rod and restrained from rotation about the second axis such that rotation of the threaded rod results in axial movement of the follower along the second axis; and
bearings supporting the roller for rotation about the follower.

12. A continuously variable transmission comprising:
first and second plates constrained to counter-rotate about a first axis;
a first bevel gear supported for rotation about the first axis;
a roller frictionally engaging the first and second plates and supported to rotate about a second axis perpendicular to the first axis, the roller moveable along the second axis; and
a second bevel gear drivably connected to the roller and meshing with the first bevel gear.

13. The continuously variable transmission of claim 12 further comprising a forward/reverse mechanism having a first shaft and a second shaft and configured to alternately selectively establish a positive and a negative speed ratio between the first and second shafts.

14. The continuously variable transmission of claim 13 further comprising a launch device having a third shaft and a fourth shaft and configured to transmit torque from the third shaft to the fourth shaft when the fourth shaft is stationary.

15. The continuously variable transmission of claim 14 wherein:
the third shaft is an input shaft;
the fourth shaft is driveably connected to the first shaft; and
the second shaft is driveably connected to the first plate.

* * * * *